United States Patent [19]

Hayashi et al.

[11] Patent Number: 5,804,638

[45] Date of Patent: Sep. 8, 1998

[54] BLACK POLYAMIDE RESIN COMPOSITION

[75] Inventors: Akihiko Hayashi; Masataka Nishikawa, both of Osaka, Japan

[73] Assignee: Orient Chemical Industries, Ltd., Osaka, Japan

[21] Appl. No.: 820,318

[22] Filed: Mar. 18, 1997

[30] Foreign Application Priority Data

Mar. 21, 1996 [JP] Japan .................................. 8-093376

[51] Int. Cl.$^6$ ..................................................... C08K 3/04
[52] U.S. Cl. ......................... 524/495; 524/494; 524/496
[58] Field of Search .................................. 524/494, 495, 524/496

[56] References Cited

U.S. PATENT DOCUMENTS

| | | | |
|---|---|---|---|
| 3,962,172 | 6/1976 | Wurmb et al. | 260/37 N |
| 4,391,936 | 7/1983 | Waggoner | 524/89 |

FOREIGN PATENT DOCUMENTS

| | | |
|---|---|---|
| 0052944 A | 6/1982 | European Pat. Off. . |
| 3529788 A1 | 2/1986 | Germany . |
| 60-43379 | 9/1985 | Japan . |
| 62-246958 | 10/1987 | Japan . |
| 3-50263 | 3/1991 | Japan . |
| 3-79665 | 4/1991 | Japan . |
| 6-128479 | 5/1994 | Japan . |

OTHER PUBLICATIONS

Grant et al., 1987, Grant & Hackh's Chemical Dictionary, p. 392.

Chemical Dictionary, Grant and Hackh eds., McGraw–Hill (1987).

*Primary Examiner*—Edward J. Cain
*Attorney, Agent, or Firm*—McGlew and Tuttle

[57] ABSTRACT

A black polyamide resin composition comprising a polyamide resin and coloring agents, wherein nigrosine, aniline black and carbon black are contained as the coloring agents.

22 Claims, No Drawings

BLACK POLYAMIDE RESIN COMPOSITION

BACKGROUND OF THE INVENTION

1. Field of the Invention

The present invention relates to a black polyamide resin composition good in appearance, surface gloss, mechanical characteristics and light fastness.

2. Description of the Prior Art

Being excellent in mechanical and thermal properties and oil resistance, polyamide resins are widely used for molded plastic products in the field of parts of automobiles, electric and electronic products, etc. Also, there have been attempts to improve the mechanical characteristics, heat resistance, chemical resistance, etc. of a polyamide resin by formulating a fibrous reinforcing material and other materials in the polyamide resin to meet the requirements of a wide variety of industrial applications, and some products are already in practical application. In recent years, there has been a marked trend toward replacement of conventional metal parts of automobiles, bicycles, etc. with fiber-reinforced polyamide resin parts for the purpose of weight reduction, corrosion prevention, manufacturing process simplification, etc.

Polyamide resins are colored for decoration, color identification, improvement of light fastness of plastic materials, content protection and shading and for other purposes; black-colored molded products are industrially most important. Traditionally, polyamide resins have been colored black using inorganic pigments and organic dyes/pigments such as carbon black, black metal complex dyes, azine dyes and perynone black.

Specifically, known colored polyamide resins include the molding formula described in Japanese Patent Examined Publication No. 43379/1985, which is prepared by coloring a polyamide resin with carbon black and nigrosine (azine dye); a resin composition prepared by coloring a polyamide resin with nigrosine (azine dye) and a copper phthalocyanine pigment; and the polyamide resin composition described in Japanese Patent Unexamined Publication No. 79665/1991, which is prepared by adding magnesium oxide and carbon black to a polyamide resin.

Also, examples of colored fiber-reinforced polyamide resins include the polyamide vehicle element described in Japanese Patent Unexamined Publication No. 246958/1987, which comprises a nylon 66/6 copolymer, glass fiber, an inorganic mineral powder and an azine dye; the thermoplastic resin composition described in Japanese Patent Unexamined Publication No. 50263/1991, which comprises a polyamide resin, a modified polyolefin, a fibrous reinforcing material and carbon black; and the glass fiber-reinforced black polyamide resin composition described in Japanese Patent Unexamined Publication No. 128479/1994, which comprises a polyamide resin, surface-treated glass fiber and an azine dye.

However, these colored resin compositions are all unsatisfactory in appearance, surface gloss, mechanical characteristics, light fastness, etc. In recent years, there has been strong commercial demand for a black polyamide resin composition possessing improved light fastness, since polyamide resin products have been widely used in products for outdoor use.

SUMMARY OF THE INVENTION

The object of the present invention is to provide a black polyamide resin composition which is good in appearance, surface gloss, mechanical characteristics and light fastness, and which permits production of molded products reinforced with fiber or not.

The present inventors found that molded products of a black polyamide resin composition colored with nigrosine, aniline black and carbon black is excellent in all of appearance, surface gloss, mechanical characteristics and light fastness. Based on this finding, the present inventors developed the present invention.

Accordingly, the black polyamide resin composition of the present invention as not reinforced with fiber, is a polyamide resin composition comprising a polyamide resin and coloring agents, wherein nigrosine, aniline black and carbon black are contained as the coloring agents.

The black polyamide resin composition of the present invention as reinforced with fiber is a polyamide resin composition comprising a polyamide resin, coloring agents and a fibrous reinforcing material, wherein nigrosine, aniline black and carbon black are contained as the coloring agents.

Because the coloring agents in the present invention are highly dispersible and compatible with polyamide resins, they are capable of more uniformly blackening polyamide resins even by the dry color method, in comparison with the use of only black pigments such as carbon black as coloring agents. This uniform coloring effect is especially marked in polyamide resin compositions containing a fibrous reinforcing material, in which coloring agents are very difficult to disperse due to the influence of the fibrous reinforcing material.

Of the coloring agents for the present invention, nigrosine and aniline black act as crystallization retarders on polyamide resins during shaping treatment. For this reason, when a polyamide resin is molded using a metal mold, the crystallization rate of the polyamide resin is well controlled to ensure a uniform distribution of the black polyamide resin composition throughout the inside of the mold, resulting in improved shaping precision. In addition, a molded product with good appearance and gloss is obtained because the molded product obtained is unlikely to have fine ruggedness on the surface thereof.

Accordingly the molded product of black polyamide resin composition of the present invention, whether containing a fibrous reinforcing material or not, is good in appearance, surface gloss and coloring uniformity and crystallization uniformity, and undergoes almost no mechanical characteristic deterioration, in comparison with counterparts containing no coloring agents, because the dispersibility and solubility of the coloring agents in the resin are high, and because nigrosine and aniline black act as crystallization retarders on the polyamide resin. Also, the molded product of the present invention is ideal for use as materials for parts of automobiles, electric and electronic products, etc., and can be widely used in such products, because it possesses excellent light fastness, showing only slow discoloration and almost no color hue change during the discoloration period. Furthermore, the coloring agents contained in the molded product of the present invention undergo no discoloration or color change even during the hot melting process for shaping, and do not affect polyamide resin fluidity during the hot melting process.

DETAILED DESCRIPTION OF THE INVENTION

The following description applies to both the black polyamide resin composition of the present invention as not reinforced with fiber and the black polyamide resin composition of the present invention as reinforced with fiber, unless these two are discriminated.

Examples of such polyamide resins include nylon 6, nylon 66, nylon 46, nylon 11, nylon 12, nylon 69, nylon 610, nylon 612, nylon 96, amorphous nylon, nylon RIM, nylon MIX 6, and copolymers of two or more thereof, such as nylon 6/66 copolymer, nylon 6/66/610 copolymer, nylon 6/66/11/12 copolymer and crystalline nylon/amorphous nylon copolymer. Also, the polyamide resin of the present invention may be a polymer alloy of a polyamide resin and another synthetic resin. Examples of such polymer alloys include polyamide/polyester alloy, polyamide/polyphenylene oxide alloy, polyamide/polycarbonate alloy, polyamide/polyolefin alloy, polyamide/styrene/acrylonitrile alloy polyamide/acrylic acid ester and polyamide/silicone alloy. These polyamide resins may be used singly or in combination of two or more kinds.

The amount of coloring agent used may be 0.01 to 10% by weight relative to the polyamide resin in the case of ordinary resin coloring (for low-color-density molded products). This amount is preferably 0.01 to 5% by weight, and in view of mechanical properties, it is more preferably 0.01 to 1.0% by weight. In the case of masterbatch coloring (for high-color-density molded products), the amount of coloring agent used may be 20 to 50% by weight relative to the polyamide resin, and is preferably 20 to 35% by weight.

The amounts of coloring agent components used may be, relative to the polyamide resin, 0.01 to 50% by weight of nigrosine, 0.001 to 40% by weight of aniline black, and 0.001 to 20% by weight of carbon black. Preferably, these amounts are, relative to the polyamide resin, 0.01 to 30% by weight of nigrosine, 0.01 to 10% by weight of aniline black, and 0.01 to 5% by weight of carbon black.

Also, it is preferable that the amounts of nigrosine, aniline black and carbon black relative to the total weight of these three components be 40 to 95% by weight, 4 to 50% by weight and 1 to 30% by weight, respectively, since the molded product obtained has good appearance and surface gloss and excellent mechanical properties.

Nigrosine as described above is a black azine condensed mixture like that described in the COLOR INDEX as C.I. SOLVENT BLACK 5 or C.I. SOLVENT BLACK 7. Its synthesis can be achieved by, for example, oxidizing and dehydrate-condensing aniline, aniline hydrochloride and nitrobenzene in the presence of iron chloride at a reaction temperature of 160° to 180° C.

Nigrosine is produced as a mixture of various different compounds, depending on reaction conditions, charged materials and charging ratio, and is assumed to be a mixture of various azine compounds such as triphenazineoxazine a and phenazineazine.

Examples of commercial nigrosine products include Spirit Black SB and Spirit Black AB (all categorized under C.I. SOLVENT BLACK 5); and Nigrosine Base EE, Nigrosine Base EX, Nigrosine Base EX-BP and Nigrosine Base SA (all categorized under C.I. SOLVENT BLACK 7) [all trade names for nigrosine products of Orient Chemical Industries Ltd.].

Aniline black as described above is an oxidized condensed mixture of black aniline derivatives like that described in the COLOR INDEX as C.I. PIGMENT BLACK 1. Depending on oxidization condensation reaction conditions, it occurs as a mixture of several kinds of intermediates and byproducts. Its synthesis can be achieved by, for example, oxidize-condensing aniline hydrochloride and aniline at a reaction temperature of 40° to 60° C. for 1 to 2 days, immersing the resulting reaction product in a bichromate solution acidified with sulfuric acid for a short period of time to ensure complete oxidization condensation and obtain a black mixture.

Examples of commercial aniline black products include Monolite Black B, Monolite Black BX and Monolite Black XBE-HD (all trade names for aniline black products of ICI);

No. 2 Super Black, No.2 Aniline Black and No. 25 Aniline Black (all trade names for aniline black products of Tokyo Shikizai);

Diamond Black #300 and Diamond Black S (both trade names for aniline black products of Noma Kagaku); Diamond Black S (trade name for aniline black product of Daito Kasei kogyo);

and Paliotol Black D0080, Paliotol Black K0080, Paliotol Black L0080, Xehal Light Black SNT, Thermosolid Supra Black SNT and Pigment Black A (all trade names for aniline black products of BASF).

Carbon black as described above is exemplified by channel black, furnace black, acetylene black and others such as those described in the COLOR INDEX as C.I. PIGMENT BLACK 7.

Examples of commercial carbon black products include #44, #45, #55, #600, #960 and #2300 (all trade numbers for carbon black products of Mitsubishi Chemical Corporation);

201 and #1204 (both trade numbers for carbon black products of Showa Denko);

G GPF, #100 FEF, #S SRF and #SL SRF-LM (all trade numbers for carbon black products of Hokutan Shoji);

200 HAF, #10 FEF, #50 SRF and #55 GF (all trade numbers for carbon black products of Nittetsu Kagaku);

and Asahi #55, Asahi #60H, Asahi #70 and Asahi #80 (all trade numbers for carbon black products of Asahi Thermal).

The nigrosine and aniline black used as coloring agents in the present invention include higher fatty acid salts or metal salts of nigrosine and higher fatty acid salts or metal salts of aniline black, respectively. As shown in formula (I) below, for example, nigrosine and aniline black produce a higher fatty acid salt of a coloring agent by an ionic reaction with the higher fatty acid salt or metal salt. Any known production method can be used without limitation to produce such a higher fatty acid salt of a coloring agent, as long as it allows a reaction of the coloring agent and the higher fatty acid, whether in an aqueous or non-aqueous system (organic solvent system).

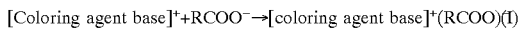

[Coloring agent base]⁺+RCOO⁻→[coloring agent base]⁺(RCOO)(I)

(cationic component) (anionic component of higher fatty acid) (higher fatty acid salt of coloring agent)

The black polyamide resin composition of the present invention can also be prepared by separately converting one or more coloring agent components (i.e., nigrosine and aniline black) to higher fatty acid salt(s), then mixing the resulting salt(s) with a polyamide resin. It can also be prepared by converting some or all coloring agent components to respective higher fatty acid salts, and mixing the resulting salts with a polyamide resin. Specifically, there can be used a coloring agent prepared by reacting nigrosine and a higher fatty acid in an organic solvent system, spray drying the resulting product, and uniformly powder mixing the spray dried product with aniline black and carbon black using a blender. There can also be used a coloring agent prepared by powder mixing nigrosine and aniline black, making the resulting mixture compatible with water using a small amount of organic solvent, reacting the mixture with a metal salt of a higher fatty acid in an aqueous system, then filtering the reaction product, drying the cake filtered out, and adding carbon black to the dry product. There can also be used a coloring agent prepared by reacting nigrosine and a higher fatty acid, and a different higher fatty acid and aniline black, in respective organic solvent systems, spray drying each reaction product, then powder mixing them with carbon black.

To synthesize a higher fatty acid salt of a coloring agent or metal salt of a higher fatty acid of a coloring agent of the present invention, there can be used linear, branched or cyclic saturated or unsaturated monocarboxylic acids having 6 to 24 carbon atoms, or metal salts thereof, for instance. Examples of such higher fatty acids include lauric acid, myristic acid, palmitic acid, stearic acid, oleic acid, linolic acid, linolenic acid and behenic acid. Monocarboxylic acids having 12 to 18 carbon atoms are preferred, with greater preference given to palmitic acid, stearic acid and oleic acid. To synthesize a higher fatty acid salt of a coloring agent, there can be used one kind of higher fatty acid or a mixture of two or more kinds of higher fatty acids, as a mixed fatty acid. Of the metal salts of the above-mentioned higher fatty acids, salts of alkali metals such as Li, Na and K, and salts of alkaline earth metals such as Ca and Mg are preferred.

Examples of commercial products of such higher fatty acids and metal salts thereof include NAA-34, NAA-35, NAA-38, NAA-60, NAA-82, NAA-102, NAA-122, NAA-415, NAA-142, NAA-160, NAA-171, NAA-172, NAA-180, NAA-174, NAA-175, NAA-222S and NAA-222 (all trade names for higher fatty acid products of NOF CORPORATION);

Extra Linoleic 90, Extra Palmitoleic 90, Extra Oleic 90, Ekuyashi Fatty Acid 100, Palm Fatty Acid 300, Palmitic Acid 60, Palmitic Acid 90, TST-U, TST-P, Stearic Acid 85, Stearic Acid 90, Behenic Acid 35, Behenic Acid 70, Behenic Acid 85, PM#200, PM#300 and PM#810 (all trade names for higher fatty acid products of Miyoshi Oil & Fat Co., Ltd.);

Sun Fat 12, Sun Fat 14, Sun Fat 16, Sun Fat 18 and Mikuni Wax (all trade names for higher fatty acid products or higher fatty acid metal salt products of Lion Corporation); and SS-40N, OS Soap and FR-14 (all trade names for higher fatty acid metal salt products of Kao Corporation).

When all or some coloring agent components (nigrosine, aniline black) are higher fatty acid salts, their dispersibility and solubility in polyamide resin are dramatically high. This dispersibility/solubility-improving effect is particularly high in polyamide resin compositions containing a fibrous reinforcing material, in which coloring agent dispersion is difficult. Such improvement in dispersibility and solubility ensures uniform dispersion of coloring agents, resulting in the obtainment of a molded product with beautiful appearance and improved light fastness and heat resistance. In addition, the molded product obtained has stabilized mechanical properties and improved chemical resistance.

The black polyamide resin composition of the present invention may incorporate appropriate amounts of various fibrous reinforcing materials according to use and purpose. Such fibrous reinforcing materials may be any ones without limitation, as long as they can be used to reinforce ordinary synthetic resins. Examples of such fibrous reinforcing materials include glass fiber, carbon fiber and organic fibers (aramid, polyphenylene sulfide, nylon, polyester, liquid crystal polymer, etc.), with preference given to glass fiber. When glass fiber is used, it may be of alkali-containing glass, low-alkali glass, alkali-free glass, or the like, with preference given to E glass and T glass. The glass fiber used preferably has a fiber length of 2 to 15 mm and a fiber diameter of 1 to 20 μm. The glass fiber is not subject to limitation as to form. For example, the glass fiber may be in the form of roving, milled fiber, chopped strand, or the like. Such forms of glass fiber may be used in combination of two or more kinds.

The amount of fibrous reinforcing material (glass fiber etc.) used may be 5 to 120% by weight relative to the resin component content. This amount is preferably 10 to 60% by weight, more preferably 20 to 50% by weight. Amounts lower than 5% by weight and those exceeding 120% by weight are not quite appropriate because not full reinforcing effect of glass fiber etc. is sumetimes obtained in the former case, and because moldability decreases in the latter case.

The above-described glass fiber may be surface treated with a coupling agent to increase its affinity for resin. Examples of useful coupling agents include silane coupling agents such as aminosilane, epoxysilane, vinylsilane and methacrylsilane, and titanate, aluminum, chromium, zirconium and borane coupling agents.

Of these coupling agents, silane and titanate coupling agents are preferred. Particularly preferred are silane coupling agents, exemplified by triethoxysilane, vinyltris(β-methoxyethoxy)silane, γ-methacryloxypropyltrimethoxysilane, γ-glycidoxypropyltrimethoxysilane, β-(3,4-epoxycyclohexyl)ethyltrimethoxysilane, N- β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane and γ-chloropropyltrimethoxysilane.

Any method of surface treating glass fiber with such a coupling agent can be used without limitation; useful methods include the aqueous solution method, the organic solvent method and the spray method, all of which have traditionally been used commonly. Although the amounts of coupling agents used are not subject to limitation, they are normally used so that the total amount is 0.1 to 1.5% by weight relative to the glass fiber.

The black polyamide resin composition of the present invention may contain various additives as necessary. Examples of such additives include auxiliary coloring agents, dispersing agents, modifiers, fillers, stabilizers, plasticizers, ultraviolet absorbents, light stabilizers, antioxidants, antistatic agents, lubricants, releasing agents, crystallization promoters, crystal nucleating agents, flame retardants and elastomers for improved impact resistance.

When a auxiliary coloring agents is necessary to enhance coloring power or adjust color tone, or for other purposes, the black polyamide resin composition of the present invention may contain a small amount of inorganic pigment, organic pigment or organic dye, as long as the object of the present invention is not interfered with.

Examples of dispersing agents include stearates such as calcium stearate and sodium stearate; polyoxyethylene alkyl ethers such as polyoxyethylene lauryl ether and polyoxyethylene stearyl ether; and alkylnaphthalenesulfonates such as sodium alkylnaphthalenesulfonate.

Examples of modifiers include silicone compounds such as amino-modified silicone oil and alkyl-modified silicone oil.

Examples of ultraviolet absorbents and light stabilizers include benzotriazole compounds, benzophenone compounds, salicylate compounds, cyanoacrylate compounds, benzoate compounds, oxalide compounds, hindered amine compounds and niccolates.

Examples of antioxidants include phenol compounds, phosphorus compounds, sulfur compounds and thioether compounds.

Examples of antibacterial/antifungal agents include 2-(4'-thiazolyl)-benzimidazole, 10,10'-oxybisphenoxarsine, N-(fluorodichloromethylthio)phthalimide and bis(2-pyridylthio-1-oxide)zinc.

Examples of flame retardants include halogen-containing compounds such as tetrabromobisphenol A derivatives, hexabromodiphenyl ether and tetrabromophthalic anhydride; phosphorus-containing compounds such as triphenyl phosphate, triphenyl phosphite, red phosphorus and ammonium polyphosphate; nitrogen-containing compounds such as urea and guanidine; silicone-containing compounds such as silicone oil, organic silane and aluminum silicate; and antimony compounds such as antimony trioxide and antimony phosphate.

Examples of lubricants include esters of aliphatic alcohols, partial esters of polyhydric alcohols and partial ethers of polyhydric alcohols.

Examples of inorganic fillers include glass flake, glass beads, silica, quartz, amorphous silicic acid, talc, magnesium carbonate, calcium carbonate, alumina, montmorillonite, metal powder, kaolin, calcium silicate, mica and wallastonite.

The black polyamide resin composition of the present invention can be prepared using an optionally chosen method. For example, it can be prepared by mixing in an appropriate mixer a polyamide resin, in a pellet or powder form, pulverized coloring agents, and fibrous reinforcing material, and various additives used as necessary. Typically, these formula components are preferably dispersed as uniformly as possible. For this purpose, there can be used, for example, those methods in which one or more of the formula components are thoroughly mixed using a mechanical mixer, after which they are mixed with the other component(s) (e.g., method in which coloring agents and a polyamide resin are thoroughly mixed, after which they are mixed with the other components including glass fiber), and those methods in which a dry-blended composition is kneaded in a molten state using a heated extruder to obtain a uniform composition. The resin composition of the present invention can also be prepared by adding coloring agents to a monomer containing an appropriate polymerization catalyst, and conducting polymerization to yield the desired polyamide resin. Shaping can be achieved using various processing machines, including extruders, injection molding machines and roll mills. The resin composition of the present invention can also be kneaded in a molten state and extruded into needles using an extruder, and cut to desired length to yield granules.

Also, a masterbatch (high-color-density molded product) of the black polyamide resin composition of the present invention can, for example, be obtained by mixing the polyamide resin as the master batch base, in a powder or pellet form, and coloring agents in a tumbler, a super mixer, or the like, pelletizing or coarsely granulating the mixture by the hot melt method using an extruder, a batch kneader, a roll kneader, or the like. A masterbatch can also be obtained by adding coloring agents to a polyamide resin for masterbatch remaining in solution after synthesis, then removing the solvent.

More specifically, a black polyamide resin composition containing a fibrous reinforcing material can, for example, be prepared by mixing a polyamide resin, nigrosine, aniline black and carbon black, then kneading in a molten state this mixture and a fibrous reinforcing material such as glass fiber using an ordinary extruder, or by kneading in a molten state a polyamide resin and a fibrous reinforcing material such as glass fiber using an ordinary extruder, while nigrosine, aniline black and carbon black are fed using a constant-rate feeder, or by preparing a polyamide resin masterbatch containing high concentrations of nigrosine, aniline black and carbon black, mixing this masterbatch, a polyamide resin and a fibrous reinforcing material such as glass fiber, and kneading in a molten state this mixture using an ordinary extruder.

The black polyamide resin composition of the present invention can be molded using any shaping method in common use, exemplified by injection molding, extrusion molding, compression molding, foaming molding, blow molding, vacuum molding, injection blow molding, rotary molding, calender molding and solution casting.

EXAMPLES

The present invention is hereinafter described in more detail by means of the following examples, which are not to be construed as limitative on the present invention.

Examples 1 through 10 and Comparative Examples 1 through 5 pertain to embodiments wherein the polyamide resin is nylon 6.

Example 1

Glass-reinforced nylon 6 (fiber-reinforced polyamide resin having a mixing ratio by weight of polyamide resin-:glass fiber =80:20, produced by Ube Industries, Ltd., trade name: 1011GC- 4) . . . 100 g Nigrosine (produced by Orient Chemical Industries Ltd., trade name: Nigrosine Base SA) . . . 0.18 g Aniline black (produced by Tokyo Shikizai, trade name: No. 2 Super Black) . . . 0.09 g Carbon black (produced by Mitsubishi Chemical Corporation, trade name: #960) . . . 0.03 g The above components were stirred and mixed in a stainless steel tumbler for 1 hour.

The resulting mixture was then kneaded in a molten state at 250° C. using a vent-type extruder (produced by Enpla Sangyo, trade name: E30SV), after which it was treated by a conventional method to prepare colored pellets, which were then dried in a drying machine at 80° C. for 3 hours.

The dried colored pellets were injection molded at 240° C. by an ordinary method using an injection molding machine (produced by Kawaguchi Tekko, trade name: KM50-C) to yield a uniformly black test piece (48×86×3 mm) having good appearance and surface gloss.

The results of measurement of the appearance, light fastness, Izod impact value and tensile strength of this test piece are shown in Table 3 below.

In Tables 1 through 6, the ratio by weight of nigrosine, aniline black and carbon black is expressed by the mixing ratio N:A:C.

Appearance test and assessment

Regarding appearance, the reflective density (OD value) of the test piece was measured using a transmission/reflection densitometer (produced by Macbeth, trade name: TR-927).

In general, test pieces having higher reflective density values (OD values) are judged to have greater surface smoothness and more surface gloss.

Light fastness test and assessment

Using the Sunshine xenon long-life weather meter (produced by Shimadzu Corporation, trade name: XW-1200A), the test piece was exposed to light for 200, 400, 600 and 800 hours in a cycle of the 006 test conditions (phases 1 and 2 repeated under the conditions shown below).

After each exposure period, the reflective density (OD value) of the test piece was determined using a transmission/reflection densitometer (produced by Macbeth, trade name: TR-927).

| <Light fastness test conditions with Sunshine xenon long-life weather meter> | | |
|---|---|---|
| [Setting item] | [Phase 1] | [Phase 2] |
| Irradiance (Wm/2) (E) | 70 | 70 |
| Black standard temperature (°C.) | 63 | — |
| Rainfall test | No | Yes |
| Humidity (%) | 60 | — |
| Time (min) | 120 | 18 |

In general, test pieces having higher reflective density values (OD values) are judged to have greater surface smoothness and more surface gloss, and those showing greater OD value reduction over exposure time adjudged to have undergone higher degrees of color hue discoloration and color change.

Determination of Izod impact value

In accordance with the test specifications for Izod impact value (JIS K6810, with notch), the Izod impact value of the test piece was determined using an Izod impact value tester (produced by Toyo Seiki, trade name: Universal Impact Tester B-122403800).

Determination of tensile strength

In accordance with the test specifications for tensile strength (JIS K7113), the tensile strength of the test piece was determined using a tensile strength tester (produced by Orientech, trade name: UTM-10T).

Examples 2 through 7

Uniformly black test pieces (48×86×3 mm) with good appearance and surface gloss were obtained in the same manner as in Example 1, except that the coloring agents nigrosine, aniline black and carbon black were replaced with those listed in Table 1 below.

The results of measurement of the appearance, light fastness, Izod impact value and tensile strength of these test pieces are shown in Table 3 below.

No. 2 Super Black (trade name for aniline black produced by Tokyo Shikizai)

No. 25 Aniline Black (trade name for aniline black produced by Tokyo Shikizai)

960 (trade name for carbon black produced by Mitsubishi Chemical Corporation)

Examples 8 and 9 pertain to embodiments wherein one or more of the coloring agents are higher fatty acid salts.

Example 8

Fifty grams of nigrosine (produced by Orient Chemical Industries Ltd., trade name: Nigrosine Base EX) and 28.4 g of stearic acid were placed in a 1 liter flask, and 300 ml of methanol was added, followed by stirring at 50° C. for 1 hour. After stirring, the solution was transferred to a rotary evaporator (produced by Tokyo Rika, trade name: N-2-29), and methanol was recovered to yield 86.6 g of Black Dye Example 1 (black powder).

Next, the following components were stirred and mixed in a stainless steel tumbler for 1 hour.

Glass-reinforced nylon 6 (produced by Ube Industries, Ltd., trade name: 1011GC-4) . . . 100 g Black Dye Example 1 (black powder) . . . 0.15 g Aniline black (produced by Tokyo Shikizai, trade name: No. 2 Super Black) . . . 0.12 g Carbon black (produced by Mitsubishi Chemical Corporation, trade name: #960) . . . 0.03 g The resulting mixture was kneaded in a molten state at 250° C. using a vent-type extruder (produced by Enpla Sangyo, trade name: E30SV), after which it was treated by a conventional method to prepare colored pellets, which were then dried in a drying machine at 80° C. for 3 hours.

The dried colored pellets were injection molded at 240° C. by an ordinary method using an injection molding machine (produced by Kawaguchi Tekko, trade name: KM50-C) to yield a uniformly black test piece (48×86×3 mm) having good appearance and surface gloss.

The results of measurement of the appearance, light fastness, Izod impact value and tensile strength of this test piece are shown in Table 3 below.

Example 9

Forty grams of nigrosine (produced by Orient Chemical Industries Ltd., trade name: Spirit Black SB) and 20 g of

TABLE 1

| | Nigrosine | | Aniline black | | Carbon black | | Mixing |
|---|---|---|---|---|---|---|---|
| Example | Trade name | Quantity (g) | Trade name | Quantity (g) | Trade name | Quantity (g) | ratio (N:A:C) |
| 2 | Nigrosine Base EX | 0.18 | No. 25 Aniline Black | 0.09 | #960 | 0.03 | 6:3:1 |
| 3 | Spirit Black SB | 0.18 | No. 25 Aniline Black | 0.06 | #960 | 0.06 | 6:2:2 |
| 4 | Nigrosine Base SA | 0.15 | No. 2 Super Black | 0.09 | #960 | 0.06 | 5:3:2 |
| 5 | Nigrosine Base SA | 0.15 | No. 2 Super Black | 0.06 | #960 | 0.09 | 5:2:3 |
| 6 | Nigrosine Base SA | 0.21 | No. 2 Super Black | 0.06 | #960 | 0.03 | 7:2:1 |
| 7 | Nirgosine Base SA | 0.24 | No. 2 Super Black | 0.03 | #960 | 0.03 | 8:1:1 |

The trade names shown in Table 1 correspond to the respective products of the manufacturers listed below.

Nigrosine Base SA (trade name for nigrosine produced by Orient Chemical Industries Ltd.)

Spirit Black SB (trade name for nigrosine produced by Orient Chemical Industries Ltd.)

Nigrosine Base EX (trade name for nigrosine produced by Orient Chemical Industries Ltd.)

aniline black (produced by Tokyo Shikizai, trade name: No. 2 Aniline Black) were placed in a 1 liter flask, and 500 g of water was added, followed by heating with high-speed stirring. To the resulting dispersion, an aqueous solution of 26.0 g of potassium oleate in 100 g of 70° C. water was gradually added drop by drop. After stirring at 50° C. for 3 hours, the mixture was filtered; the cake filtered out was washed with water and dried at 70° C. to yield 81.0 g of Black Dye Example 2 (black powder).

Next, the following components were stirred and mixed in a stainless steel tumbler for 1 hour.

Glass-reinforced nylon 6 (produced by Ube Industries, Ltd., trade name: 1011GC-4) . . . 100 g Black Dye Example 2 (black powder) . . . 0.27 g Carbon black (produced by Mitsubishi Chemical Corporation, trade name: #960) . . . 0.03 g The resulting mixture was kneaded in a molten state at 250° C. using a vent-type extruder (produced by Enpla Sangyo, trade name: E30SV), after which it was treated by a conventional method to prepare colored pellets, which were then dried in a drying machine at 80° C. for 3 hours.

The dried colored pellets were injection molded at 240° C. by an ordinary method using an injection molding machine (produced by Kawaguchi Tekko, trade name: KM50-C) to yield a uniformly black test piece (48×86×3 mm) having good appearance and surface gloss.

The results of measurement of the appearance, light fastness, Izod impact value and tensile strength of this test piece are shown in Table 3 below.

Example 10 pertains to an embodiment wherein a masterbatch (high-color-density molded product) is produced, then diluted and molded using a fiber-reinforced polyamide resin.

Example 10

Nylon 6 (produced by Toray Industries, Inc., trade name: CM1017) . . . 75.0 g

Nigrosine (produced by Orient Chemical Industries Ltd., trade name: Nigrosine Base SA) . . . 17.5 g Aniline black (produced by Tokyo Shikizai, trade name: No. 2 Super Black) . . . 5.0 g Carbon black (produced by Mitsubishi Chemical Corporation, trade name: #960) . . . 2.5 g The above components were stirred and mixed in a stainless steel tumbler for 1 hour.

The resulting mixture was kneaded in a molten state at 250° C. using a twin-screw extruder (produced by Ikegai Corporation, trade name: PCM-30), while the gas generated was evacuated, to yield black pellets. These pellets were dried under reduced pressure at 120° C. for 1 day to yield a masterbatch having a coloring agent concentration of 25% by weight.

This masterbatch and glass-reinforced nylon 6 (produced by Ube Industries, Ltd., trade name: 1011GC-4) were stirred and mixed in a stainless steel tumbler for 1 hour to dilute the masterbatch 100 fold (ratio by weight) in the glass-reinforced nylon 6.

The resulting mixture was dried at 80° C. in a drying machine for 3 hours to yield colored pellets, which were then injection molded at 240° C. by an ordinary method using an injection molding machine (produced by Kawaguchi Tekko, trade name: KM50-C) to yield a uniformly black test piece (48×86×3 mm) having good appearance and surface gloss.

The results of measurement of the appearance, light fastness, Izod impact value and tensile strength of this test piece are shown in Table 3 below.

Comparative Example 1

Glass-reinforced nylon 6 (produced by Ube Industries, Ltd., trade name: 1011GC-4) . . . 100 g Nigrosine (produced by Orient Chemical Industries Ltd., trade name: Nigrosine Base SA) . . . 0.3 g Using the above components, colored pellets were prepared and injection molded in the same manner as in Example 1 to yield a uniformly black test piece (48×86×3 mm).

The results of measurement of the appearance, light fastness, Izod impact value and tensile strength of this test piece are shown in Table 3 below.

Comparative Example 2

Glass-reinforced nylon 6 (produced by Ube Industries, Ltd., trade name: 1011GC-4) . . . 100 g Carbon black (produced by Mitsubishi Chemical Corporation, trade name: #960) . . . 0.3 g Using the above components, colored pellets were prepared and injection molded in the same manner as in Example 1 to yield a black test piece (48×86×3 mm) having little surface gloss due to glass fiber floating and having a significantly uneven color distribution due to uneven dispersion of the coloring agents.

The results of measurement of the appearance, light fastness, Izod impact value and tensile strength of this test piece are shown in Table 3 below.

Comparative Examples 3 through 5

Colored pellets were prepared and injection molded using an extruder in the same manner as in Comparative Example 1, except that the coloring agent nigrosine was replaced with those listed in Table 2 below, to yield uniformly black test pieces (48×86×3 mm) having good appearance and surface gloss.

The results of measurement of the appearance, light fastness, Izod impact value and tensile strength of these test pieces are shown in Table 3 below.

TABLE 2

| Comparative Example | Nigrosine | | Aniline black | | Carbon black | | Mixing ratio (N:A:C) |
| | Trade name | Quantity (g) | Trade name | Quantity (g) | Trade name | Quantity (g) | |
| --- | --- | --- | --- | --- | --- | --- | --- |
| 3 | Nigrosine Base SA | 0.24 | — | — | #960 | 0.06 | 8:0:2 |
| 4 | Nigrosine Base SA | 0.24 | No. 2 Super Black | 0.06 | — | — | 8:2:0 |
| 5 | — | — | No. 2 Super Black | 0.30 | — | — | 0:10:0 |

TABLE 3

|  | Appearance test (OD value) | Light fastness test (OD value) | | | | Izod impact value (KJ/m$^2$) | Tensile strength (N/mm$^2$) | Mixing ratio (N:A:C) |
|---|---|---|---|---|---|---|---|---|
|  |  | 200 hr | 400 hr | 600 hr | 800 hr |  |  |  |
| Example 1 | 2.60 | 2.19 | 1.69 | 1.38 | 1.12 | 7.36 | 102.98 | 6:3:1 |
| Example 2 | 2.55 | 2.12 | 1.69 | 1.40 | 1.12 | 7.32 | 101.93 | 6:3:1 |
| Example 3 | 2.57 | 2.11 | 1.67 | 1.26 | 1.08 | 7.33 | 102.56 | 6:2:2 |
| Example 4 | 2.46 | 2.06 | 1.61 | 1.33 | 0.97 | 7.37 | 102.43 | 5:3:2 |
| Example 5 | 2.40 | 2.08 | 1.64 | 1.30 | 1.06 | 7.33 | 101.89 | 5:2:3 |
| Example 6 | 2.52 | 1.80 | 1.00 | 0.79 | 0.69 | 7.39 | 102.15 | 7:2:1 |
| Example 7 | 2.68 | 1.57 | 0.95 | 0.72 | 0.65 | 7.36 | 103.01 | 8:1:1 |
| Example 8 | 2.46 | 2.08 | 1.65 | 1.32 | 1.03 | 7.34 | 101.56 | 5:4:1 |
| Example 9 | 2.56 | 2.16 | 1.63 | 1.30 | 1.10 | 7.36 | 102.02 | 6:3:1 |
| Example 10 | 2.60 | 2.15 | 1.69 | 1.35 | 1.14 | 7.40 | 103.25 | 7:2:1 |
| Comparative Example 1 | 2.73 | 0.62 | 0.62 | 0.62 | 0.51 | 7.40 | 101.79 | 10:0:0 |
| Comparative Example 2 | 2.00 | 1.90 | 1.80 | 1.70 | 1.60 | 7.30 | 101.38 | 0:0:10 |
| Comparative Example 3 | 2.42 | 1.42 | 1.20 | 1.08 | 0.92 | 7.35 | 100.56 | 8:0:2 |
| Comparative Example 4 | 2.55 | 1.61 | 1.02 | 0.80 | 0.61 | 7.37 | 101.78 | 8:2:0 |
| Comparative Example 5 | 2.20 | 1.35 | 1.06 | 0.80 | 0.61 | 7.32 | 101.93 | 0:10:0 |

Examples 11 through 18 and Comparative Examples 6 through 10 pertain to embodiments wherein the polyamide resin is nylon 66.

Example 11

Glass-reinforced nylon 66 (fiber-reinforced polyamide resin having a mixing ratio by weight of polyamide resin:glass fiber =80:20, produced by Du Pont, trade name: ZYTEL 70G -33L) . . . 100 g
Nigrosine (produced by Orient Chemical Industries Ltd., trade name: Nigrosine Base SA) . . . 0.18 g
Aniline black (produced by Tokyo Shikizai, trade name: No. 2 Super Black) . . . 0.09 g
Carbon black (produced by Mitsubishi Chemical Corporation, trade name: #960) . . . 0.03 g The above components were stirred and mixed in a stainless steel tumbler for 1 hour.

The resulting mixture was kneaded in a molten state at 280° C. using a vent-type extruder (produced by Enpla Sangyo, trade name: E30SV), after which it was treated by a conventional method to prepare colored pellets, which were then dried in a drying machine at 80° C. for 3 hours.

The dried colored pellets were injection molded at 270° C. by an ordinary method using an injection molding machine (produced by Kawaguchi Tekko, trade name: KM50-C) to yield a uniformly black test piece (48×86×3 mm) having good appearance and surface gloss.

The results of measurement of the appearance, light fastness, Izod impact value and tensile strength of this test piece are shown in Table 6 below.

Examples 12 through 17

Uniformly black test pieces (48×86×3 mm) having good appearance and surface gloss were obtained in the same manner as in Example 11, except that the coloring agents nigrosine, aniline black and carbon black were replaced with those listed in Table 4 below.

The results of, measurement of the appearance, light fastness, Izod impact value and tensile strength of these test pieces are shown in Table 6 below.

TABLE 4

| Comparative Example | Nigrosine | | Aniline black | | Carbon black | | Mixing ratio (N:A:C) |
|---|---|---|---|---|---|---|---|
|  | Trade name | Quantity (g) | Trade name | Quantity (g) | Trade name | Quantity (g) |  |
| 12 | Nigrosine Base EX | 0.18 | No. 25 Aniline | 0.09 | #960 | 0.03 | 6:3:1 |
| 13 | Spirit Black SB | 0.18 | No. 25 Aniline | 0.06 | #960 | 0.06 | 6:2:2 |
| 14 | Nigrosine Base SA | 0.15 | No. 2 Super Black | 0.09 | #960 | 0.06 | 5:3:2 |
| 15 | Nigrosine Base SA | 0.15 | No. 2 Super Black | 0.06 | #960 | 0.09 | 5:2:3 |
| 16 | Nigrosine Base SA | 0.21 | No. 2 Super Black | 0.06 | #960 | 0.03 | 7:2:1 |
| 17 | Nigrosine Base SA | 0.24 | No. 2 Super Black | 0.03 | #960 | 0.03 | 8:1:1 |

Examples 18 and 19 pertain to embodiments wherein one or more of the coloring agents are higher fatty acid salts.

Example 18

Glass-reinforced nylon 66 (produced by Du Pont, trade name: ZYTEL 70G-33L) . . . 100 g
Black Dye Example 1 (black powder) . . . 0.21 g
Aniline black (produced by Tokyo Shikizai, trade name: No. 2 Super Black) . . . 0.03 g Carbon black (produced by Mitsubishi Chemical Corporation, trade name: #960) . . . 0.06 g
The above components were stirred and mixed in a stainless steel tumbler for 1 hour.

The resulting mixture was kneaded in a molten state at 280° C. using a vent-type extruder (produced by Enpla Sangyo, trade name: E30SV), after which it was treated by a conventional method to prepare colored pellets, which were then dried in a drying machine at 80° C. for 3 hours.

The dried colored pellets were injection molded at 270° C. by an ordinary method using an injection molding machine (produced by Kawaguchi Tekko, trade name: KM50-C) to yield a uniformly black test piece (48×86×3 mm) having good appearance and surface gloss.

The results of measurement of the appearance, light fastness, Izod impact value and tensile strength of this test piece are shown in Table 6 below.

Example 19

Glass-reinforced nylon 66 (produced by Du Pont, trade name: ZYTEL 70G-33L) . . . 100 g Black Dye Example 2 (black powder) . . . 0.27 g Carbon black (produced by Mitsubishi Chemical Corporation, trade name: #960) . . . 0.03 g The above components were stirred and mixed in a stainless steel tumbler for 1 hour.

The resulting mixture was kneaded in a molten state at 280° C. using a vent-type extruder (produced by Enpla Sangyo, trade name: E30SV), after which it was treated by a conventional method to prepare colored pellets, which were then dried in a drying machine at 80° C. for 3 hours.

The dried colored pellets were injection molded at 270° C. by an ordinary method using an injection molding machine (produced by Kawaguchi Tekko, trade name: KM50-C) to yield a uniformly black test piece (48×86×3 mm) having good appearance and surface gloss.

The results of measurement of the appearance, light fastness, Izod impact value and tensile strength of this test piece are shown in Table 6 below.

Example 20 pertains to an embodiment wherein a masterbatch (high-color-density molded product) is produced, then diluted and molded using a fiber-reinforced polyamide resin.

Example 20

Glass-reinforced nylon 66 (produced by Du Pont, trade name: 101L-NC10) . . . 70 g Nigrosine (produced by Orient Chemical Industries Ltd., trade name: Nigrosine Base SA) . . . 15 g Aniline black (produced by Tokyo Shikizai, trade name: No. 2 Super Black) . . . 7.5 g Carbon black (produced by Mitsubishi Chemical Corporation, trade name: #960) . . . 7.5 g The above components were stirred and mixed in a stainless steel tumbler for 1 hour.

The resulting mixture was kneaded in a molten state at 280° C. using a twin-screw extruder (produced by Ikegai Corporation, trade name: PCM-30), while the gas generated was evacuated, to yield black pellets. These pellets were dried under reduced pressure at 120° C. for 1 day to yield a masterbatch having a coloring agent concentration of 30% by weight.

This mastebatch and glass-reinforced nylon 66 (produced by Du Pont, trade name: ZYTEL 70G-33L) were stirred and mixed in a stainless steel tumbler for 1 hour to dilute the masterbatch 100 fold in the glass-reinforced nylon 66.

The resulting mixture was dried at 80° C. in a drying machine for 3 hours to yield colored pellets, which were then injection molded at 270° C. by an ordinary method using an injection molding machine (produced by Kawaguchi Tekko, trade name: KM50-C) to yield a uniformly black test piece (48×86×3 mm) having good appearance and surface gloss.

The results of measurement of the appearance, light fastness, Izod impact value and tensile strength of this test piece are shown in Table 6 below.

Comparative Example 6

Glass-reinforced nylon 66 (produced by Du Pont, trade name: ZYTEL 70G-33L) . . . 100 g Nigrosine (produced by Orient Chemical Industries Ltd., trade name: Nigrosine Base SA) . . . 0.3 g Using the above components, colored pellets were prepared and injection molded in the same manner as in Example 11 to yield a uniformly black test piece (48×86×3 mm).

The results of measurement of the appearance, light fastness, Izod impact value and tensile strength of this test piece are shown in Table 6 below.

Comparative Example 7

Glass-reinforced nylon 66 (produced by Du Pont, trade name: ZYTEL 70G-33L) . . . 100 g Carbon black (produced by Mitsubishi Chemical Corporation, trade name: #960) . . . 0.3 g Using the above components, colored pellets were prepared and injection molded in the same manner as in Example 11 to yield a black test piece (48×86×3 mm) having little surface gloss due to glass fiber floating and having a significantly uneven color distribution due to uneven dispersion of the coloring agents.

The results of measurement of the appearance, light fastness, Izod impact value and tensile strength of this test piece are shown in Table 6 below.

Comparative Examples 8 through 10

Colored pellets were prepared and injection molded using an extruder in the same manner as in Comparative Example 6, except that the coloring agent nigrosine was replaced with those listed in Table 5 below, to yield uniformly black test pieces (48×86×3 mm) having good appearance and surface gloss.

The results of measurement of the appearance, light fastness, Izod impact value and tensile strength of these test pieces are shown in Table 6 below.

TABLE 5

| Comparative Example | Nigrosine Trade name | Quantity (g) | Aniline black Trade name | Quantity (g) | Carbon black Trade name | Quantity (g) | ratio (N:A:C) |
|---|---|---|---|---|---|---|---|
| 8 | Nigrosine Base SA | 0.24 | — | — | #960 | 0.06 | 8:0:2 |
| 9 | Nigrosine Base SA | 0.24 | No. 2 Super Black | 0.06 | — | — | 8:2:0 |
| 10 | — | — | No. 2 Super Black | 0.30 | — | — | 0:10:0 |

TABLE 6

| | Appearance test | Light fastness test (OD value) | | | | Izod impact value | Tensile strength | Mixing ratio |
|---|---|---|---|---|---|---|---|---|
| | (OD value) | 200 hr | 400 hr | 600 hr | 800 hr | (KJ/m$^2$) | (N/mm$^2$) | (N:A:C) |
| Example 11 | 2.59 | 1.90 | 1.21 | 0.98 | 0.65 | 6.34 | 118.46 | 6:3:1 |
| Example 12 | 2.61 | 1.90 | 1.18 | 1.07 | 0.78 | 6.56 | 117.46 | 6:3:1 |
| Example 13 | 2.65 | 1.81 | 1.14 | 0.86 | 0.81 | 7.01 | 118.54 | 6:2:2 |
| Example 14 | 2.63 | 1.87 | 1.20 | 1.09 | 0.82 | 6.98 | 116.29 | 5:3:2 |
| Example 15 | 2.66 | 1.93 | 1.22 | 1.06 | 0.89 | 6.72 | 119.19 | 5:2:3 |
| Example 16 | 2.62 | 1.87 | 1.21 | 1.03 | 0.72 | 6.99 | 119.73 | 7:2:1 |
| Example 17 | 2.58 | 1.91 | 1.25 | 1.01 | 0.76 | 6.85 | 118.58 | 8:1:1 |
| Example 18 | 2.60 | 1.92 | 1.17 | 1.00 | 0.72 | 6.31 | 118.52 | 7:1:2 |
| Example 19 | 2.62 | 1.89 | 1.15 | 1.02 | 0.73 | 6.42 | 118.63 | 6:3:1 |
| Example 20 | 2.61 | 1.93 | 1.20 | 1.05 | 0.78 | 7.05 | 119.21 | 2:1:1 |
| Comparative Example 6 | 2.78 | 0.58 | 0.58 | 0.58 | 0.52 | 6.72 | 117.20 | 10:0:0 |
| Comparative Example 7 | 2.05 | 2.00 | 2.00 | 2.00 | 1.90 | 6.42 | 117.35 | 0:0:10 |
| Comparative Example 8 | 2.58 | 1.52 | 1.02 | 0.73 | 0.62 | 6.84 | 118.73 | 8:0:2 |
| Comparative Example 9 | 2.67 | 1.66 | 0.86 | 0.62 | 0.44 | 6.86 | 118.48 | 8:2:0 |
| Comparative Example 10 | 2.32 | 1.40 | 1.11 | 0.96 | 0.73 | 6.73 | 117.56 | 0:10:0 |

The entire disclosure of Japanese Patent Application No. 8-93376 filed on March 25, 1996 including specification, claims and summary are incorporated herein by reference in its entirety.

What is claimed is:

1. Black polyamide resin composition comprising a polyamide resin and coloring agents, wherein nigrosine, aniline black and carbon black are contained as coloring agents, said nigrosine comprising a black azine condensed mixture and said aniline black comprising an oxidized condensed mixture of black aniline derivatives.

2. Composition of claim 1 wherein said polyamide resin is nylon 6 and/or nylon 66.

3. Composition of claim 1 wherein the ratios of nigrosine, aniline black and carbon black to polyamide resin are about 0.01–50% by weight, 0.001–40% by weight and 0.001–20% by weight, respectively.

4. Composition of claim 1 wherein at least part of the ratios of nigrosine, aniline black and carbon black to the total weight of nigrosine, aniline black and carbon black are about 40–95% by weight, 4–50% by weight and 1–30% by weight, respectively.

5. Composition of claim 1 wherein at least part of coloring agents are higher fatty acid salts.

6. Composition of claim 1 wherein said nigrosine comprises a black azine condensed mixture, which mixture corresponds to a condensed mixture whose synthesis can be achieved by oxidizing and dehydrate-condensing aniline, aniline hydrochloride and nitrobenzene in the presence of iron chloride at a reaction temperature of about 160°–180° C., and said aniline black comprises an oxidized condensed mixture of black aniline derivatives, which mixture corresponds to an oxidized condensed mixture whose synthesis can be achieved by oxidize-condensing aniline hydrochloride and aniline at a reaction temperature of about 40°–60° C.

7. Composition of claim 1 wherein said nigrosine corresponds to that of Color Index Solvent Black 5 or Color Index Solvent Black 7, and said aniline black corresponds to that of Color Index Pigment Black 1.

8. Black polyamide resin composition comprising a polyamide resin, coloring agents and a fibrous reinforcing material, wherein nigrosine, aniline black and carbon black are contained as coloring agents, said nigrosine comprising a black azine condensed mixture and said aniline black comprising an oxidized condensed mixture of black aniline derivatives.

9. Composition of claim 8 wherein the fibrous reinforcing material is glass fiber.

10. Composition of claim 8 wherein the ratio of fibrous reinforcing material to polyamide resin is about 10–120% by weight.

11. Composition of claim 9 wherein the ratio of fibrous reinforcing material to polyamide resin is about 10–120% by weight.

12. Composition of claim 8 wherein said polyamide resin is nylon 6 and/or nylon 66.

13. Composition of claim 8 wherein the ratios of nigrosine, aniline black and carbon black to polyamide resin are about 0.01–50% by weight, 0.001–40% by weight and 0.001–20% by weight, respectively.

14. Composition of claim 8 wherein at least part of the ratios of nigrosine, aniline black and carbon black to the total weight of nigrosine, aniline black and carbon black are about 40–95% by weight, 4–50% by weight and 1–30% by weight, respectively.

15. Composition of claim 8 wherein at least part of the coloring agents are higher fatty acid salts.

16. Composition of claim 8 wherein said nigrosine comprises a black azine condensed mixture, which mixture corresponds to a condensed mixture whose synthesis can be achieved by oxidizing and dehydrate-condensing aniline, aniline hydrochloride and nitrobenzene in the presence of iron chloride at a reaction temperature of about 160°–180° C., and said aniline black comprises an oxidized condensed mixture of black aniline derivatives, which mixture corresponds to an oxidized condensed mixture whose synthesis can be achieved by oxidize-condensing aniline hydrochloride and aniline at a reaction temperature of about 40°–60° C.

17. Composition of claim 8 wherein said nigrosine corresponds to that of Color Index Solvent Black 5 or Color Index Solvent Black 7, and said aniline black corresponds to that of Color Index Pigment Black 1.

18. Black polyamide resin composition good in appearance, surface gloss, mechanical characteristics and light fastness, comprising a polyamide resin and coloring agents, wherein nigrosine, aniline black and carbon black are contained as coloring agents, said nigrosine comprising a black azine condensed mixture, which mixture corresponds to a condensed mixture whose synthesis can be achieved by oxidizing and dehydrate-condensing aniline, aniline hydrochloride and nitrobenzene in the presence of iron chloride at a reaction temperature of about 160°–180° C., and said aniline black comprising an oxidized condensed mixture of black aniline derivatives, which mixture corresponds to an oxidized condensed mixture whose synthesis can be achieved by oxidize-condensing aniline hydrochloride and aniline at a reaction temperature of about 40°–60° C., the ratios of nigrosine, aniline black and carbon black to polyamide resin being about 0.01–50% by weight, 0.001–40% by weight and 0.001–20% by weight, respectively.

19. Composition of claim 18 wherein at least part of the coloring agents are higher fatty acid salts.

20. Composition of claim 18 wherein the composition further comprises a fibrous reinforcing material, the ratio of the fibrous reinforcing material to polyamide resin being about 10–120% by weight.

21. Composition of claim 20 wherein the fibrous reinforcing material is glass fiber.

22. Composition of claim 20 wherein at least part of the coloring agents are higher fatty acid salts.

* * * * *